Nov. 24, 1970 HOZUMI HIROTA ET AL 3,542,542
MAGNETIC PERMEABILITY MATERIAL
Filed April 5, 1968
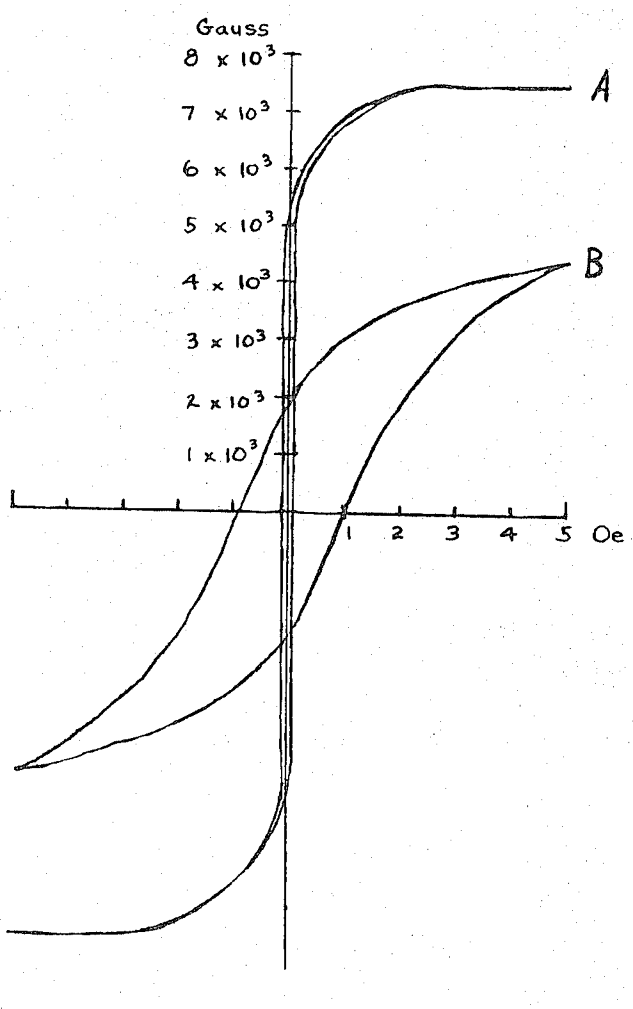
HOZUMI HIROTA AND
YASUMASA KOMATSU, INVENTORS
By Wenderoth Lind and Ponack
Attorneys 3,542,542
Patented Nov. 24, 1970

3,542,542

MAGNETIC PERMEABILITY MATERIAL

Hozumi Hirota, Nara, and Yasumasa Komatsu, Osaka, Japan, assignors to Matsushita Electric Industrial Co., Ltd., Osaka, Japan Filed Apr. 5, 1968, Ser. No. 719,097
Int. Cl. C22c 19/00
U.S. Cl. 75—170 6 Claims

ABSTRACT OF THE DISCLOSURE

Ferromagnetic material with a $Cr_{23}C_6$ type of crystal structure comprising approximately, in atomic percentages:

| | |
|---|---|
| Cobalt | 51.0–59.0 |
| Iron | 49.0–17.0 |
| Titanium | 0.02– 1.0 |
| Aluminum | 6.5–11.2 |
| Boron | 17.0–25.9 |

said crystal structure having such an atom arrangement that point positions "*f*" and "*h*" of F*m*3*m* are occupied by cobalt, iron and titanium atoms, point positions "*a*" and "*c*" of F*m*3*m* are occupied by aluminum atoms, and point position "*e*" of F*m*3*m* is occupied by boron atoms, is useful, e.g., in the manufacture of magnetic heads for video tape recorders.

This invention relates to new magnetic material and more particularly to ferromagnetic material characterized by high mechanical hardness, high permeability, and impressive saturation magnetization.

There has been a demand for magnetic material having high permeability and low coercive force as well as high mechanical hardness. For example, material of this kind is suitable for use in the head assembly of a magnetic tape recorder, especially a recorder for video recording, where head wear is normally an important consideration. Known soft magnetic materials are not entirely satisfactory with respect to all these properties for practical use. It is also necessary that a soft magnetic material for this use should have a reasonably high Curie temperature; a Curie temperature of 20 to 30° C. greatly restricts the practical application of the material.

An object of this invention is to provide material characterized by high mechanical hardness, high magnetic permeability, high saturation magnetization and high Curie temperature.

The invention will now be described in connection with the accompanying drawing in which is shown a graph illustrating the static hysteresis loop of a typical composition according to the invention (curve A), in comparison with a curve B of material having no titanium additive.

According to the present invention, material defined by the chemical formula $$Co_{20-x}Fe_xAl_3B_6$$

is a ferromagnetic crystalline material having a $Cr_{23}C_6$ type of structure; if $x$ has a value of approximately 4, then the material has a high magnetic permeability. It is possible to form a new composition $$Co_{20-x-y}Fe_xTi_yAl_3B_6$$

by partial replacement of the cobalt and iron by titanium while preserving the original cubic structure. The material obtained in this way has a face centered cubic structure belonging to the space group $0_h{}^5$ F*m*3*m*, that is, it is a $Cr_{23}C_6$ type structure.

In the atomic arrangement of a crystal of $Co_{20}Al_3B_6$, cobalt atoms occupy the point positions "*f*" and "*h*" of F*m*3*m*, aluminum atoms occupy the point positions "*a*" and "*c*" and boron atoms occupy the point position "*e*," using the nomenclature set out by Stadelmaier and others in Metall, 1962, vol. 16, pages 773 and 1229 and in Z. Metallkde, 1963, Bd. 54, pages 640 and 644.

The material $Co_{20-x-y}Fe_xTi_yAl_3B_6$ is a single phase of the $Cr_{23}C_6$ type of structure when $(x+y)$ is less than about 10. When the substituted proportion $(x+y)$ is greater than about 10, the resultant material has two phases of the $Cr_{23}C_6$ type phase and another phase. The presence of another phase adversely affects the magnetic permeability of the material.

In the accompanying drawing, curve A is the B–H curve of the material $Co_{16.24}Fe_{3.673}Ti_{0.087}Al_3B_6$. Curve B is the corresponding curve of the material $Co_{15.8}Fe_{4.2}Al_3B_6$ in which the titanium is omitted. It will be seen that the addition of the small proportion of titanium has an appreciable effect in reducing the coercive force and increasing the magnetic permeability. It appears likely that the reduction of coercive force is due to the reduction of the magneto-restrictive effect in this phase.

The effective permeability of the material $Co_{20-x-y}Fe_xTi_yAl_3B_6$ is indicated as a function of the atomic percentage of cobalt and titanium in Table I. The atomic percentage of aluminum and boron are held at the values of 10.35 percent and 20.7 percent respectively. The samples of such materials are prepared by melting in a manner which is described hereinafter, and the effective permeability is measured at frequency of 100 Hz. in known manner. Table I shows some magnetic and electrical data on the cobalt-iron-titanium ternary system. It is necessary for obtaining higher permeability that the value $x$ lies in the range from 2.9 to 5.2, and $y$ lies in the range from 0.005 to 0.30. The material according to the invention has a hardness of 1100 on the Vickers' scale; on the other hand, corresponding soft magnetic materials commercially available have a hardness of about 500 or less. The Curie temperature of the material $Co_{20-x-y}Fe_xTi_yAl_3B_6$ is in the range from 260 to 400° C. and the saturation magnetization is in the range of 63 to 86 emu/g., when $x$ and $y$ lie in the ranges mentioned above.

In Table I, the compositions and effective permeability of 29 samples are given. The proportions of the components are given as atomic percentages.

The material $Co_{20-x-y}Fe_xTi_yAl_3B_6$ has a $Cr_{23}C_6$ type crystalline structure; the magnetic properties of the material are not adversely affected if the proportions of aluminum atoms or boron atoms or both differ slightly from stoichiometric proportions. A larger deviation in both boron and aluminum atoms will affect the magnetic properties. A suitable atomic percentage of aluminum is in the range of 6.5 to 11.2 percent, and that of boron in the range of 17.0 to 25.9 percent.

Useful magnetic materials are obtained by employing the following proportions in atomic percentage in accordance with the invention:

| | |
|---|---|
| Cobalt | 51.0–59.0 |
| Iron | 9.0–18.0 |
| Titanium | 0.02–1.0 |
| Aluminum | 6.5–11.2 |
| Boron | 17.0–25.9 |

Better materials are obtained with the compositions:

| | |
|---|---|
| Cobalt | 53.0–58.0 |
| Iron | 10.2–16.0 |
| Titanium | 0.02–0.8 |
| Aluminum | 6.5–11.2 |
| Boron | 17.0–25.9 |

Materials of superior magnetic permeability are obtained with the compositions:

| | |
|---|---|
| Cobalt | 55.0–57.0 |
| Iron | 11.4–13.9 |
| Titanium | 0.02–0.6 |
| Aluminum | 6.5–11.2 |
| Boron | 17.0–25.9 |

The materials described can be prepared by per se known metallurgical methods, employing either sintering or melting. Starting materials are high purity cobalt, aluminum, boron, iron and titanium, all in granular form. Material available in granular form commercially can be used. The constituents, in the form of pieces roughly 2.5 mm. in diameter, are mixed in the appropriate proportions and heated in an argon atmosphere at about 1600° C. by a per se conventional method. The melt is then allowed to cool to room temperature. The resultant ingot is a pentamerous compound consisting of a single phase of the crystal structure referred to above. The melting point of the compound is approximately 1400 to 1500° C. No special cooling process is required to obtain satisfactory magnetic properties. This is an advantage compared with the production of a conventional material such as Alnico which needs special cooling processes. There is no effect of the cooling rate on the resultant magnetic properties of materials according to the invention.

In preparing the material by the sintering method, an intimate mixture of powders of the constituents are pressed into a desired shape; pressure is suitably higher than about 500 kg./cm$^2$. The higher the pressure used, the more dense is the resulting pressed product, so that for most purposes a high pressure is desirable. The pressed product is then sintered by heating at 800 to 1000° C. for a time which may be in the range of 1 to 200 hours. The heating is carried out in an atmosphere of reduced air, or in a non-oxidizing atmosphere such as argon, and pressure of $10^{-2}$ to $10^{-6}$ mm. Hg. Porosity of the sintered material can be controlled by the pressure and/or by the sintering temperature and the sintering time in a manner well known per se in powder metallurgy technique.

Magnetic permeability is measured on a ring of the material, cut from an ingot prepared by one of the methods described above. In a typical sample for measurement, the ring has an outer diameter of 14.5 mm., an inner diameter of 5.0 mm. and a thickness of 2.0 mm. The ring is wound with 50 turns of Litz wire, and the measurement of magnetic permeability is carried out in per se known manner.

The various compositions described are very suitable for use in the manufacture of magnetic heads for video tape recorders.

The following examples of specific compositions are given by way of illustration only.

EXAMPLE 1

A mixture was prepared of the following composition, in atomic percentages:

| | |
|---|---|
| Cobalt | 56.39 |
| Iron | 12.75 |
| Titanium | 0.30 |
| Aluminum | 9.72 |
| Boron | 20.84 |

The mixture was melted in the manner described above. Powder X-ray diffraction lines of the specimen indicated a face centered cubic lattice of the $Cr_{23}C_6$ type. This material is in an atomic proportion corresponding to the formula:

$$Co_{16.24}Fe_{3.673}Ti_{0.087}Al_{2.8}B_6$$

The material had an effective permeability of 5000 at 100 Hz., a Vickers' hardness of 1100, a Curie temperature of 220° C. and a saturation magnetic flux density of 7300 gauss.

EXAMPLE 2

In a second example, a material is prepared by melting a mixture having, in atomic percentages, the following composition:

| | |
|---|---|
| Cobalt | 54.68 |
| Iron | 12.37 |
| Titanium | 0.29 |
| Aluminum | 10.10 |
| Boron | 22.56 |

The material was melted as described above. This material has the atomic proportions corresponding to:

$$Co_{16.24}Fe_{3.673}Ti_{0.087}Al_3B_{6.7}$$

The material is a structure consisting of a single phase of the $Cr_{23}C_6$ type, and has an effective permeability of 4800 at 100 Hz.

EXAMPLE 3

As a further example, material was prepared in the same way as above, having the atomic proportions of:

$$Co_{16.24}Fe_{3.673}Ti_{0.087}Al_{3.2}B_{6.4}$$

This material had substantially the same magnetic properties as the material:

$$Co_{16.24}Fe_{3.673}Ti_{0.087}Al_3B_6$$

It will be understood that the materials and processes described above are given by way of example only.

TABLE

| Sample Number: | Composition (atomic percent) Co | Fe | Ti | Effective permeability at 100 Hz. | Initial permeability | Maximum permeability | Coercive force (oe.) | Electrical resistivity (at room temp.) (μΩ-cm.) |
|---|---|---|---|---|---|---|---|---|
| 0-1 | 62 | 7 | | ~500 | | | | |
| 0-2 | 56 | 13 | | ~1,000 | 3,000 | 10,000 | 0.2 | |
| 0-3 | 55 | 14 | | ~2,000 | | | | |
| 0-4 | 48 | 21 | | 500 | | | | |
| 1-1 | 48 | 10.9 | 0.1 | 2,270 | | | 0.2 | |
| 1-2 | 57 | 11.9 | 0.1 | 5,200 | | | 0.10 | |
| 1-3 | 56 | 12.9 | 0.1 | 6,400 | 12,000 | 60,000 | 0.05 | ~150 |
| 1-4 | 55 | 13.9 | 0.1 | 3,550 | | | 0.15 | |
| 1-5 | 52 | 16.9 | 0.1 | 2,100 | | | | |
| 2-1 | 57 | 11.8 | 0.2 | 4,360 | | | 0.12 | |
| 2-2 | 56 | 12.8 | 0.2 | 5,200 | 12,000 | 60,000 | 0.05 | |
| 2-3 | 55 | 13.8 | 0.2 | 3,950 | | | | |
| 2-4 | 54 | 14.8 | 0.2 | 3,500 | | | | |
| 2-5 | 53 | 15.8 | 0.2 | 3,260 | | | | |
| 3-1 | 58 | 10.7 | 0.3 | 2,180 | | | | |
| 3-2 | 56 | 12.7 | 0.3 | 5,000 | 22,000 | 65,000 | 0.05 | ~150 |
| 3-3 | 55 | 13.7 | 0.3 | 4,830 | 12,000 | 65,000 | 0.05 | |
| 3-4 | 54 | 14.7 | 0.3 | 3,770 | | | | |
| 3-5 | 53 | 15.7 | 0.3 | 4,000 | | | | |
| 4-1 | 59 | 9.6 | 0.4 | 2,050 | 4,000 | | | |
| 4-2 | 57 | 11.6 | 0.4 | 4,270 | | | | |
| 5-1 | 55 | 13.5 | 0.5 | 4,460 | | | 0.05 | |
| 5-2 | 53 | 15.5 | 0.5 | 3,800 | | | | |
| 5-3 | 51 | 17.5 | 0.5 | 2,020 | | | | |
| 6-1 | 56 | 12.4 | 0.6 | 4,530 | 12,000 | 60,000 | 0.05 | ~150 |
| 7-1 | 53 | 15.3 | 0.7 | 3,610 | | | | |
| 8-1 | 57 | 11.4 | 0.8 | 3,350 | | | | |
| 8-2 | 55 | 13.2 | 0.8 | 3,770 | | | | |
| 10-1 | 56 | 12.0 | 1.0 | 2,570 | 4,000 | | 0.15 | |

What we claim is:

1. A ferromagnetic material with a $Cr_{23}C_6$ type of crystal structure comprising substantially, in atomic percentages:

| | |
|---|---|
| Cobalt | 51–59 |
| Iron | 9–18 |
| Titanium | 0.02–1.0 |
| Aluminum | 6.5–11.2 |
| Boron | 17.0–25.9 |

said crystal structure having such an atom arrangement that point positions "*f*" and "*h*" of F*m*3*m* are occupied by cobalt atoms, iron and titanium atoms, point positions "*a*" and "*c*" of F*m*3*m* are occupied by aluminum atoms, and the point position "*e*" of F*m*3*m* is occupied by boron atoms.

2. A ferromagnetic composition in accordance with claim 1 and consisting substantially of:

| | |
|---|---|
| Cobalt | 53–58 |
| Iron | 10–16 |
| Titanium | 0.02–0.8 |
| Aluminum | 6.5–11.2 |
| Boron | 17.0–25.9 |

3. A ferromagnetic composition in accordance with claim 1 and consisting substantially of:

| | |
|---|---|
| Cobalt | 55–57 |
| Iron | 11–14 |
| Titanium | 0.02–0.6 |
| Aluminum | 6.5–11.2 |
| Boron | 17.0–25.9 |

4. A ferromagnetic composition in accordance with claim 1 and consisting substantially of:

$$Co_{16.24}Fe_{3.673}Ti_{0.087}Al_{2.8}B_6$$

5. A ferromagnetic composition in accordance with claim 1, and corresponding to the formula $$Co_{16.24}Fe_{3.673}Ti_{0.087}Al_3B_{6.7}$$

6. A ferromagnetic composition in accordance with claim 1, and corresponding to the formula $$Co_{16.24}Fe_{3.673}Ti_{0.087}Al_{3.2}B_{6.4}$$

References Cited

UNITED STATES PATENTS

| | | | |
|---|---|---|---|
| 3,403,996 | 10/1968 | Hirota et al. | 75—170 |
| 3,406,057 | 10/1968 | Hirota et al. | 75—170 |
| 3,433,630 | 3/1969 | Hirota | 75—170 |

RICHARD O. DEAN, Primary Examiner

U.S. Cl. X.R.

148—31.55